(12) United States Patent
Agarwal et al.

(10) Patent No.: US 10,477,470 B2
(45) Date of Patent: Nov. 12, 2019

(54) SYSTEMS AND METHODS FOR SILENT PERIOD OPERATION DURING WIRELESS COMMUNICATION

(71) Applicant: QUALCOMM Incorporated, San Diego, CA (US)

(72) Inventors: Shivendra Agarwal, Hyderabad (IN); Saurabh Patel, Hyderabad (IN); Sundaresan Ramachandran, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 15/018,590

(22) Filed: Feb. 8, 2016

(65) Prior Publication Data
US 2017/0230908 A1 Aug. 10, 2017

(51) Int. Cl.
*H04W 52/02* (2009.01)
*H04W 52/28* (2009.01)
*H04W 4/80* (2018.01)
*H04W 84/18* (2009.01)
*H04W 76/28* (2018.01)

(52) U.S. Cl.
CPC ......... *H04W 52/0209* (2013.01); *H04W 4/80* (2018.02); *H04W 52/287* (2013.01); *H04W 76/28* (2018.02); *H04W 84/18* (2013.01); *Y02D 70/1222* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/23* (2018.01); *Y02D 70/24* (2018.01); *Y02D 70/25* (2018.01)

(58) Field of Classification Search
None
See application file for complete search history.

(56) References Cited

U.S. PATENT DOCUMENTS

| | | | |
|---|---|---|---|
| 8,582,436 B2 | 11/2013 | Zheng et al. | |
| 8,589,153 B2 | 11/2013 | Khalil et al. | |
| 8,817,639 B2 | 8/2014 | Kee | |
| 2003/0133423 A1* | 7/2003 | LaDue | G01D 4/004 370/330 |
| 2006/0293885 A1 | 12/2006 | Gournay et al. | |

(Continued)

FOREIGN PATENT DOCUMENTS

EP 1463246 A1 9/2004

OTHER PUBLICATIONS

Setiawan P., et al., "On the ITU-T G.729.1 Silence Compression Scheme," 16th European Signal Processing Conference (EUSIPCO 2008), Aug. 25-29, 2008, 5 pages.

(Continued)

*Primary Examiner* — Zhiyu Lu
(74) *Attorney, Agent, or Firm* — Austin Rapp

(57) ABSTRACT

A method for wireless communication is described. The method includes receiving a silent indication (SID) start message from a modem at a Bluetooth (BT) module when the modem detects a silent period in a voice call. The method also includes sending the SID start message from the BT module to a remote BT device. The method further includes disabling a BT transmitter during the silent period based on the SID start message received from the modem.

22 Claims, 7 Drawing Sheets

(56) References Cited

U.S. PATENT DOCUMENTS

| | | | | |
|---|---|---|---|---|
| 2008/0123610 | A1* | 5/2008 | Desai | H04L 47/14 |
| | | | | 370/339 |
| 2009/0258664 | A1* | 10/2009 | Huan | H04W 52/0277 |
| | | | | 455/522 |
| 2011/0194538 | A1* | 8/2011 | Zheng | H04W 76/048 |
| | | | | 370/335 |
| 2012/0076012 | A1* | 3/2012 | Kee | H04B 1/1027 |
| | | | | 370/252 |
| 2013/0223311 | A1* | 8/2013 | Wang | H04L 5/0091 |
| | | | | 370/311 |
| 2014/0162555 | A1 | 6/2014 | Wernaers | |
| 2015/0009965 | A1* | 1/2015 | Maiya | H04L 1/0038 |
| | | | | 370/336 |

OTHER PUBLICATIONS

International Search Report and Written Opinion—PCT/US2016/067554—ISA/EPO—Mar. 3, 2017.

* cited by examiner

SYSTEMS AND METHODS FOR SILENT PERIOD OPERATION DURING WIRELESS COMMUNICATION

TECHNICAL FIELD

The present disclosure relates generally to wireless communications. More specifically, the present disclosure relates to systems and methods for silent period operation during wireless communication.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Many electronic devices may make use of different communication technologies. For example, a wireless communication device may communicate using Bluetooth technology. A wireless communication device may communicate with one or more remote Bluetooth devices. In an example, the remote Bluetooth device may be a Bluetooth headset. The wireless communication device and the remote Bluetooth device may be used to communicate during a voice call.

During the voice call, there may be one or more silent periods in which no speech data is received at the wireless communication device. During a silent period, the wireless communication device may insert comfort noise for the benefit of the listener of the remote Bluetooth device. However, transmitting comfort noise to the remote Bluetooth device may lead to high power consumption and may reduce the availability of radio frequency (RF) resources. Therefore, benefits may be realized by improved Bluetooth operation during silent periods.

SUMMARY

A method for wireless communication is described. The method includes receiving a silent indication (SID) start message from a modem at a Bluetooth (BT) module when the modem detects a silent period in a voice call. The method also includes sending the SID start message from the BT module to a remote BT device. The method further includes disabling a BT transmitter during the silent period based on the SID start message received from the modem.

The SID start message may instruct the remote BT device to insert comfort noise during the silent period. The remote BT device may be a BT headset configured to communicate with the BT module over an SCO link.

The BT module may receive the SID start message from the modem over a modem interface. The voice call may be a circuit-switched voice call.

The BT module may send the SID start message to the remote BT device in one of a last Synchronous Connection Oriented (SCO) packet as a special packet indicating the SID or an Asynchronous Connection-Less (ACL) packet indicating the SID.

The method may also include stopping an SCO link transmission to the remote BT device upon receiving the SID start message from the modem.

The method may also include receiving an SID end message from the modem at the BT module when the modem detects that the silent period ends. The BT transmitter may be enabled in response to receiving the SID end message. The SID end message may be sent to the remote BT device. The SID end message may instruct the remote BT device to stop inserting comfort noise. The method may also include resuming an SCO link transmission with the remote BT device upon sending the SID end message to the remote BT device.

The method may also include reallocating radio frequency (RF) resources used to communicate with the remote BT device to another radio interface for a coexistence operation during the silent period.

A wireless communication device is also described. The wireless communication device includes a modem and a Bluetooth (BT) module. The BT module is configured to receive an SID start message from the modem when the modem detects a silent period in a voice call. The BT module is also configured to send the SID start message to a remote BT device. The BT module is further configured to disable a BT transmitter during the silent period based on the SID start message received from the modem.

An apparatus for wireless communication is also described. The apparatus includes means for receiving an SID start message from a modem at a BT module when the modem detects a silent period in a voice call. The apparatus also includes means for sending the SID start message from the BT module to a remote BT device. The apparatus further includes means for disabling a BT transmitter during the silent period based on the SID start message received from the modem.

A computer-program product for wireless communication is also described. The computer-program product includes a non-transitory computer-readable medium having instructions thereon. The instructions include code for causing a BT module to receive an SID start message from a modem when the modem detects a silent period in a voice call. The instructions also include code for causing the BT module to send the SID start message to a remote BT device. The instructions further include code for causing the BT module to disable a BT transmitter during the silent period based on the SID start message received from the modem.

DETAILED DESCRIPTION

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
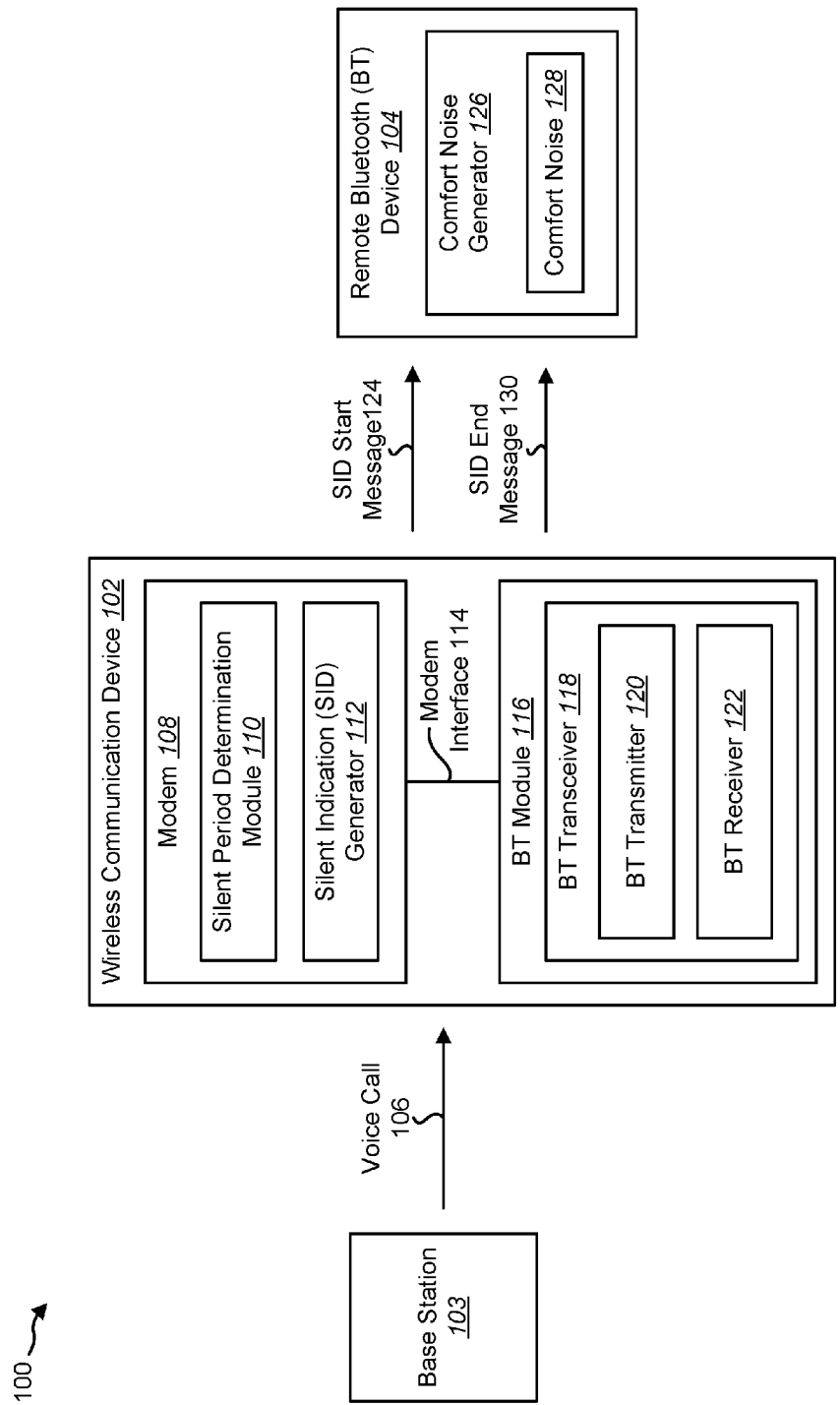
FIG. 1 is a block diagram illustrating one configuration of a wireless communication system in which systems and methods for silent period operation during wireless communication may be implemented.

FIG. 1 is a block diagram illustrating one configuration of a wireless communication system 100 in which systems and methods for silent period operation during wireless communication may be implemented. Wireless communication systems 100 are widely deployed to provide various types of communication content such as voice, data, and so on. A wireless communication system 100 may include a wireless communication device 102, a base station 103 and a remote Bluetooth (BT) device 104.

Some mobile devices may utilize multiple communication technologies. For example, one communication technology may be utilized for mobile wireless system (MWS) (e.g., cellular) communications, while another communication technology may be utilized for wireless connectivity (WCN) communications. MWS may refer to larger wireless networks (e.g., wireless wide area networks (WWANs), cellular phone networks, Long Term Evolution (LTE) networks, Global System for Mobile Communications (GSM) networks, code division multiple access (CDMA) networks, CDMA2000 networks, wideband CDMA (W-CDMA) networks, Universal mobile Telecommunications System (UMTS) networks, Worldwide Interoperability for Microwave Access (WiMAX) networks, etc.). WCN may refer to relatively smaller wireless networks (e.g., wireless local area networks (WLANs), wireless personal area networks (WPANs), IEEE 802.11 (Wi-Fi) networks, Bluetooth (BT) networks, wireless Universal Serial Bus (USB) networks, ZigBee networks, Z-wave networks, etc.).

In one configuration, the wireless communication device 102 may include a cellular transceiver (not shown) that communicates with a cellular network. The base station 103 may grant access to the cellular network. The cellular network may be a MWS, as described above. The cellular network may be a multiple-access system capable of supporting communication with multiple mobile devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, $3^{rd}$ Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), CDMA2000, etc. UTRA includes W-CDMA and Low Chip Rate (LCR) while CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices.

A wireless communication device 102 may also be referred to as a wireless device, a mobile device, mobile station, subscriber station, client, client station, user equipment (UE), remote station, access terminal, mobile terminal, terminal, user terminal, subscriber unit, etc. Examples of wireless communication devices 102 include laptop or desktop computers, cellular phones, smart phones, wireless modems, e-readers, tablet devices, gaming systems, etc. Some of these devices may operate in accordance with one or more industry standards.

Communications in a mobile wireless system (e.g., a multiple-access system) may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication device 102 may communicate with a base station 103. For example, the wireless communication device 102 may exchange wireless signals with the base station 103. The base station 103 may also be referred to as a base transceiver station (BTS) or an evolved nodeB (eNB).

In a scenario, the base station 103 may transmit a voice call 106 to the wireless communication device 102. In a cellular network, the voice call 106 may be a circuit-switched voice call. In circuit switching a dedicated communications channel (e.g., circuit) may be established between the wireless communication device 102 and another node. Examples of a circuit-switched network include the public switched telephone network (PSTN), the integrated services for digital network (ISDN), a circuit switched data (CSD) network and a high-speed circuit-switched data (HSCSD) network.

Circuit-switching may provide a high quality of service guarantee for a voice call 106 due to the dedicated communications channel. This is in contrast to packet-switching, which divides data into small, discrete packets. With packet-switching, the packets are transmitted through the network independent of each other. Therefore, with packet-switching, instead of a dedicated communications channel, the network may share links with other packets from other sources. This may result in lower quality of service guarantees than are provided by circuit-switching. Therefore, a circuit-switched voice call 106 may be preferable over a packet-switched voice call (e.g., voice over IP (VOIP)).

The wireless communication device 102 may include a modem 108. The modem 108 may be referred to as a cellular modem or a mobile station modem (MSM). The modem 108 may modulate signals sent to the base station 103 and may demodulate signals received from the base station 103. For example, the voice call 106 may be transmitted from the base station 103 as an analog signal. The base station 103 may modulate one or more carrier wave signals to encode the digital information of the voice call 106. The modem 108 may demodulate this received analog signal to decode the digital information of the voice call 106.

The wireless communication device 102 may communicate with a remote Bluetooth (BT) device 104. A user may conduct the voice call 106 using the remote BT device 104 in conjunction with the wireless communication device 102. Examples of the remote BT device 104 include a BT headset, BT speakers, BT microphone, BT speakerphone, and a BT hands-free car kit.

The wireless communication device 102 may establish a BT connection with the remote BT device 104. In an implementation, the wireless communication device 102 includes a BT module 116. The BT module 116 may perform BT operations on the wireless communication device 102. The BT module 116 may include a BT transceiver 118 that includes a BT transmitter 120 and a BT receiver 122 that are configured to send and receive BT signals, respectively. The wireless communication device 102 may be paired with the remote BT device 104.

The BT transceiver 118 may establish links with one or more remote BT devices 104. Bluetooth is a packet-based protocol with a master-slave structure. Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets and each packet is transmitted on a designated Bluetooth frequency (e.g., channel). The wireless communication device 102 may include one or more antennas configured to transmit and receive Bluetooth signals.

Communications in a Bluetooth network may be achieved based on a master polled system. The master polled system may utilize time-division duplexing (TDD) in which the wireless communication device 102 may send a packet to the remote BT device 104. In a master polled system, the master device sending the packet gives the slave wireless device the ability to transmit back.

The wireless communication device 102 may establish a channel with one or more remote BT devices 104. For example, the wireless communication device 102 may establish a first channel with a first remote BT device 104. The wireless communication device 102 may establish a second channel with a second remote BT device 104, and so forth.

The wireless communication device 102 and the remote BT device 104 may establish a link using one or more BT protocols. For transmitting general data packets, the BT link may be an asynchronous connection-less (ACL) link. For speech data, the BT link may be a synchronous connection-oriented (SCO) link or an enhanced SCO (eSCO) link. An SCO/eSCO link may include a set of reserved timeslots on an existing ACL link. The wireless communication device 102 and/or the remote BT device 104 may transmit encoded speech data in the reserved timeslot.

To enhance security, the wireless communication device 102 and remote BT device 104 may use pairing to establish a connection. In one configuration, the wireless communication device 102 may establish a relationship with a remote BT device 104 by sharing a link key. In an implementation, the link key may be a paired device profile. If both the wireless communication device 102 and the remote BT device 104 store the same link key, they are said to be paired devices. The paired devices may cryptographically authenticate the identity of the other device, ensuring it is the same device it previously paired with. Once a link key is generated, the wireless communication device 102 and remote BT device 104 may encrypt exchanged data.

The remote BT device 104 may receive the voice call 106 from the wireless communication device 102. For example, the modem 108 may provide the demodulated voice call 106 to the BT module 116 over a modem interface 114. The modem interface 114 may be referred to as an MSM interface. The modem interface 114 may facilitate communication between the modem 108 and other subsystems of the wireless communication device 102 (e.g., the BT module 116). The modem interface 114 may include hardware and software protocols for communicating with the modem 108. An example of the modem interface 114 is the Qualcomm™ MSM interface (QMI). The BT module 116 may transmit the voice call 106 to the remote BT device 104 in one or more speech packets (e.g., SCO packets).

During a voice call 106, a cellular network may employ an operation called discontinuous transmission (DTX) and discontinuous reception (DRX). With DTX, the base station 103 and/or wireless communication device 102 may turn off its transmitter when there is no speech data available. Similarly, with DRX, the base station 103 and/or wireless communication device 102 may turn off its receiver when there is no speech data available.

A silent period may be an amount of time during which there is no speech data. It is very common that people do not speak for an extended period of time, from a millisecond up to a minute or more. A silent period may also be referred to as a no-voice period.

If the other party (at the end of the call opposite the party using the wireless communication device 102) is not speaking, the base station 103 may perform frequency optimization. During a voice call 106, the base station 103 may stop transmitting data during a silent period. The base station 103 may not send a downlink speech frame to the wireless communication device 102.

The modem 108 of the wireless communication device 102 may include a silent period determination module 110 to detect silent periods in the voice call 106. When the modem 108 detects that the base station 103 is not sending speech data, the wireless communication device 102 may enter a DRX mode. Conversely, when the modem 108 detects that the base station 103 is sending speech data, the wireless communication device 102 may exit DRX mode.

If the wireless communication device 102 is not receiving any speech data from the base station 103, then the wireless communication device 102 and the remote BT device 104 may use comfort noise 128 for the benefit of the listener. Comfort noise 128 may be simulated noise used to mask when there is no speech data. Comfort noise 128 may also be referred to as silence noise.

In an approach, upon detecting the silent period, the modem 108 may insert one or more comfort noise packets during the silent period. The modem 108 may insert one or more comfort noise packets as an audio speech packet and may send the comfort noise packets to the BT module 116. The BT module 116 may then transmit the comfort noise packets to the remote BT device 104. Upon receiving the comfort noise packets from the BT module 116, the remote BT device 104 then plays the comfort noise 128 as audio. An example of this approach is described in connection with FIG. 3.

When there is no valid speech data (e.g., during a silent period), transmitting constant comfort noise packets over a BT link loads the RF antenna and the processor of the wireless communication device 102. This leads to high power consumption. As described above, the Bluetooth specifications allow the voice communication between the BT devices over the SCO/eSCO links. During this period, the connected devices are expected to be awake and communicate for 1.25 milliseconds (ms) every 3.75 ms in SCO and 2.5 ms every 7.5 ms in the case of eSCO.

In an example, an SCO connection may be used for a two hour silent voice call 106. The SCO connection (HV3 packet, CVSD encoded, 40 ms sniff interval) uses 28 milliamperes (mA). The codec power consumption is 3 mA. In this example, SCO connection power for a 2 hour call is (28 mA+3 mA)×2 [2 hour talk time]=62 mAH. Thus, for a 2 hour voice call 106, 62 mAH power will be required, even though this is just a blank voice call 106.

In the context of coexistence with other wireless communication technologies (e.g., WLAN), the BT module 116 may share wireless resources with the other wireless communication technologies. Therefore, in addition to the BT power consumption problem, the transmission of comfort noise 128 from the wireless communication device 102 to the remote BT device 104 also limits the WLAN throughput in coexistence scenarios. The coexistence algorithm performs time sharing between BT and WLAN. Thus, WLAN is left with only 2.5 ms out of 3.75 ms in each BT cycle (i.e. 66.67% bandwidth).

Benefits may be realized through opportunistic power saving in the case of BT operation during a silent period of a voice call 106. Furthermore, benefits may be realized by reallocating RF resources for coexistence scenarios. For example, the RF resources during the silent period may be reallocated to WLAN or to another BT profile (for file transfer, for instance).

In an implementation, the modem 108 may include a silent indication (SID) generator 112. The SID generator 112 may generate messages indicating whether the voice call 106 is in a silent period or a speech period. When the voice call 106 is in a silent period, the SID generator 112 may generate an SID start message 124. For example, when the silent period determination module 110 detects the start of a silent period in the voice call 106 when the base station 103 does not transmit data, the modem 108 may enter DRX mode and the SID generator 112 may generate an SID start message 124. The SID start message 124 is an indication that the silent period of a voice call 106 has begun.

The modem 108 may send the SID start message 124 to the BT module 116 over the modem interface 114. Upon receiving the SID start message 124 from the modem 108, the BT module 116 may send the SID start message 124 to the remote BT device 104. The SID start message 124 may instruct the remote BT device 104 to insert comfort noise 128 during the silent period.

In an implementation, the BT module 116 may transmit the SID start message 124 in an SCO packet. For example, the BT module 116 may transmit the last SCO packet as a special packet indicating the SID. In another implementation, the BT module 116 may send the SID start message 124 as an ACL packet indicating SID.

After sending the SID start message 124 to the remote BT device 104, the BT module 116 may disable the BT transmitter 120. The BT module 116 may enter a DTX mode in which transmissions are disabled or reduced. This may save transmission power. In one implementation, the BT module 116 may disable all BT transmission activities during the silent period. In another implementation, the BT module 116 may reduce BT transmission activities during the silent period. For example, the BT module 116 may only transmit one or more link management packets or control packets. But SCO packets will not be transmitted from the wireless communication device 102 to the remote BT device 104 during the silent period.

The remote BT device 104 may include a comfort noise generator 126. Upon receiving the SID start message 124 from the wireless communication device 102, the comfort noise generator 126 may generate comfort noise 128. The comfort noise generator 126 may generate the comfort noise 128 for the duration of the silent period.

The remote BT device 104 may have both transmission and receiving enabled, in anticipation of any traffic. However, after receiving the SID start message 124, the remote BT device 104 can do further optimization in its receiving activities. For example, the remote BT device 104 may enter a DRX mode in which it does not anticipate receiving speech data from the wireless communication device 102.

While in the silent period, the wireless communication device 102 may reallocate radio frequency (RF) resources used to communicate with the remote BT device 104 to another radio interface for a coexistence operation during the silent period. For example, the wireless communication device 102 may reallocate the RF resources to WLAN or another BT profile during the silent period of the voice call 106.

When the modem 108 detects that the silent period ends, the modem 108 may send an SID end message 130 to the BT module 116. For example, when the base station 103 resumes transmitting speech data in the voice call 106, the silent period determination module 110 may detect the end of the silent period. At this point, the modem 108 may exit the DRX mode and the SID generator 112 may generate an SID end message 130. The SID end message 130 is an indication that the silent period of the voice call 106 has ended.

The modem 108 may send the SID end message 130 to the BT module 116 over the modem interface 114. In response to receiving the SID end message 130 from the modem 108, the BT module 116 may enable the BT transmitter 120. The BT module 116 may then send the SID end message 130 to the remote BT device 104. The SID end message 130 may instruct the remote BT device 104 to stop inserting comfort noise 128.

In an implementation, the BT module 116 may transmit the SID end message 130 in an SCO packet. In another implementation, the BT module 116 may send the SID end message 130 as an ACL packet indicating SID.

Upon sending the SID end message 130 to the remote BT device 104, the BT module 116 may resume an SCO link transmission with the remote BT device 104. For example, the BT module 116 may send speech SCO packets to the remote BT device 104.

Upon receiving the SID end message 130 from the wireless communication device 102, the remote BT device 104 may stop inserting the comfort noise 128. Instead, the remote BT device 104 may exit DRX mode. The remote BT device 104 may then receive the speech SCO packets from the BT module 116.

As described above, the BT transmission activities are reduced during silent period of a voice call 106. This helps in reducing BT transmission power. Additionally, the over-the-air noise from a redundant transmission is reduced. Also, reducing BT transmission activities improves throughput for WLAN or another BT profile by providing more time bandwidth during coexistence. For example, WLAN grant intervals may be increased when the BT module 116 stops transmission of comfort noise 128.

Figure 2:
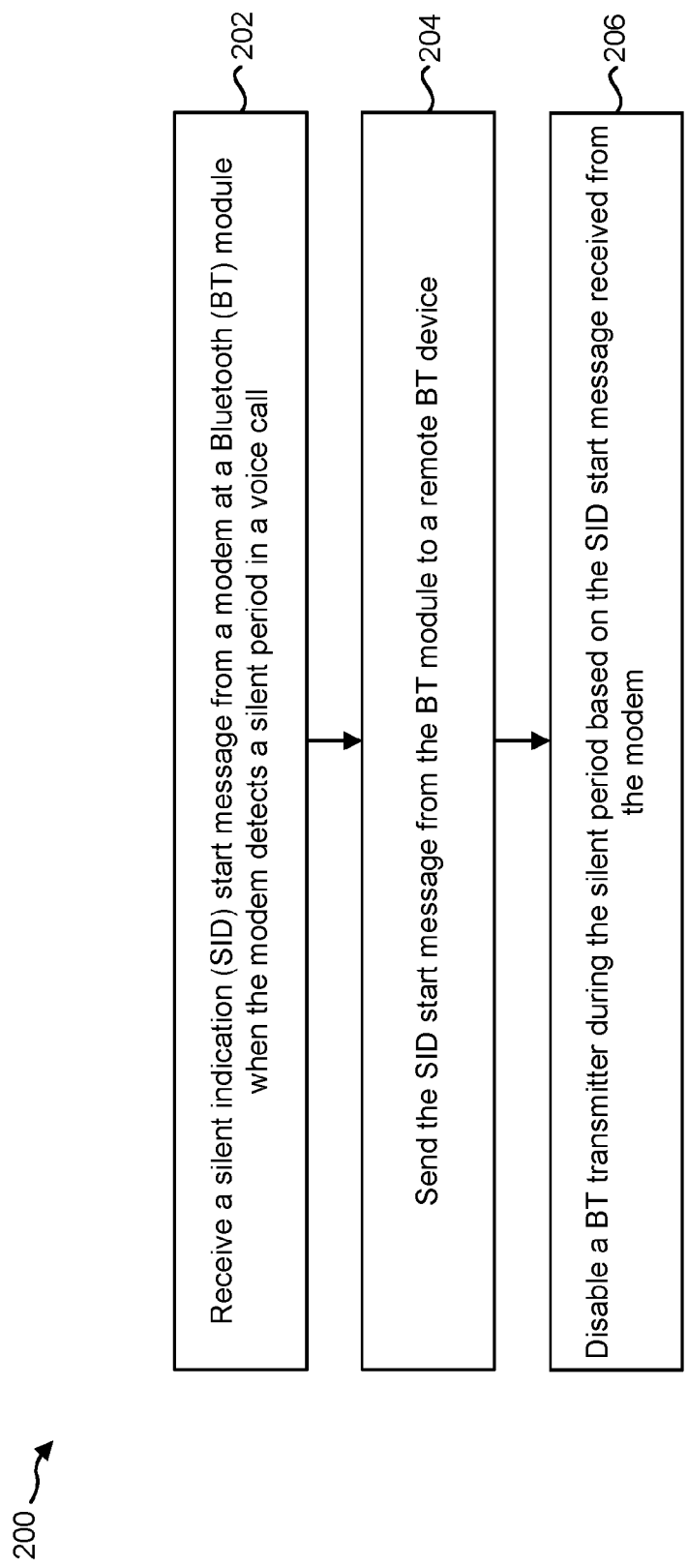
FIG. 2 is a flow diagram illustrating a method for silent period operation by a wireless communication device.

FIG. 2 is a flow diagram illustrating a method 200 for silent period operation by a wireless communication device 102. The method 200 may be performed by a BT module 116 of the wireless communication device 102. The wireless communication device 102 may be conducting a voice call 106. The wireless communication device 102 may receive a circuit-switched voice call 106 from a base station 103. The wireless communication device 102 may have a link (e.g., an SCO link) with a remote BT device 104 to transmit speech data.

The BT module 116 may receive 202 a silent indication (SID) start message 124 from a modem 108 of the wireless communication device 102 when the modem 108 detects a silent period in the voice call 106. The SID start message 124 may be received from the modem 108 over a modem interface 114. The SID start message 124 may indicate that the base station 103 has stopped transmitting speech data.

The BT module 116 may send 204 the SID start message 124 to the remote BT device 104. In an implementation, the BT module 116 may send 204 the SID start message 124 to the remote BT device 104 in a last SCO packet as a special packet indicating the SID. In another implementation, the BT module 116 may send 204 the SID start message 124 to the remote BT device 104 in an ACL packet indicating the SID. The SID start message 124 may indicate to the remote BT device 104 that it should insert comfort noise 128 in its audio stream in place of speech data.

The BT module 116 may disable 206 a BT transmitter 120 during the silent period based on the SID start message 124 received from the modem 108. For example, the BT module 116 may stop SCO link transmissions to the remote BT device 104 upon receiving the SID start message 124 from the modem 108. In an implementation, the BT module 116 may turn off the BT transmitter 120. In another implementation, the BT module 116 may suspend transmissions from the BT transmitter 120 to the remote BT device 104.

Figure 3:
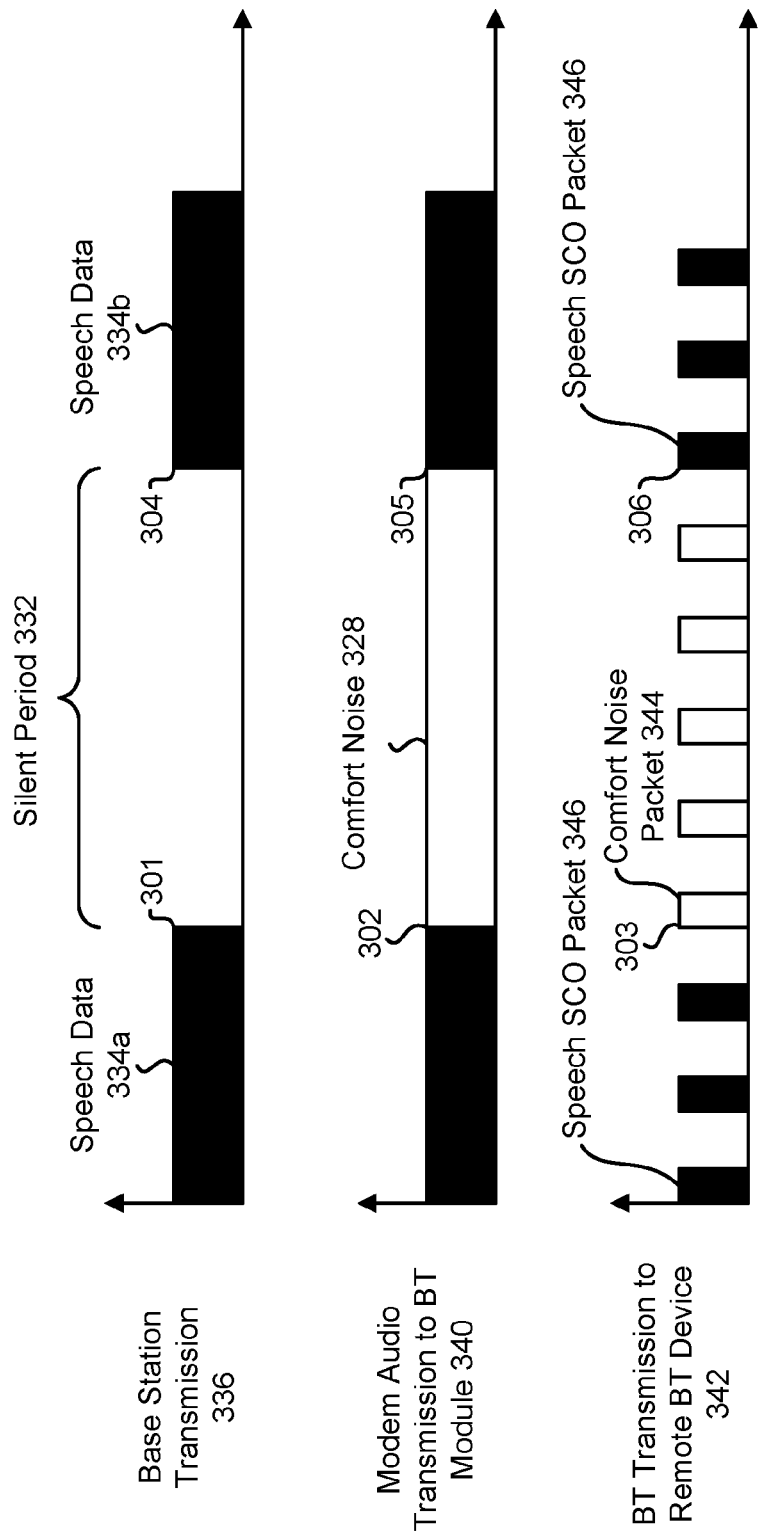
FIG. 3 illustrates an example of generating and transmitting comfort noise from a wireless communication device to a remote Bluetooth (BT) device.

FIG. 3 illustrates an example of generating and transmitting comfort noise 328 from a wireless communication device 102 to a remote BT device 104. This example shows the timing for a base station transmission 336, a modem audio transmission 340 to the BT module 116 and the corresponding BT transmission 342 to the remote BT device 104.

In this example, the base station 103 is initially transmitting speech data 334a in one or more downlink speech frames of a voice call 106. The modem 108 sends the speech data 334a to the BT module 116 via the modem interface 114. For the BT transmission 342, the BT module 116 sends the speech data 334a to the remote BT device 104 as a series of speech SCO packets 346.

At point 301, the base station 103 stops transmitting a downlink speech frame when there is no speech data. This is the start of the silent period 332.

At point 302, the modem 108 detects the start of the silent period 332. The modem 108 replaces the silent period 332 with comfort noise 328 in the modem audio transmission 340 sent to the BT module 116.

At point 303, the BT module 116 does not differentiate speech data and 334 and comfort noise 328. The BT module 116 blindly transmits the comfort noise packets 344 over the BT SCO link to the remote BT device 104. This results in additional power consumption and ties up RF resources that could be used for other coexistence operations.

At point 304, the base station 103 resumes transmission of speech data 334b. This marks the end of the silent period 332.

At point 305, the modem 108 detects the transmission of speech data 334b from the base station 103 and stops inserting comfort noise 328. The modem sends the speech data 334b to the BT module 116. At point 306, the BT module 116 receives the speech data 334b from the modem 108 and sends the speech data 334b to the remote BT device 104 as speech SCO packets 346.

Figure 4:
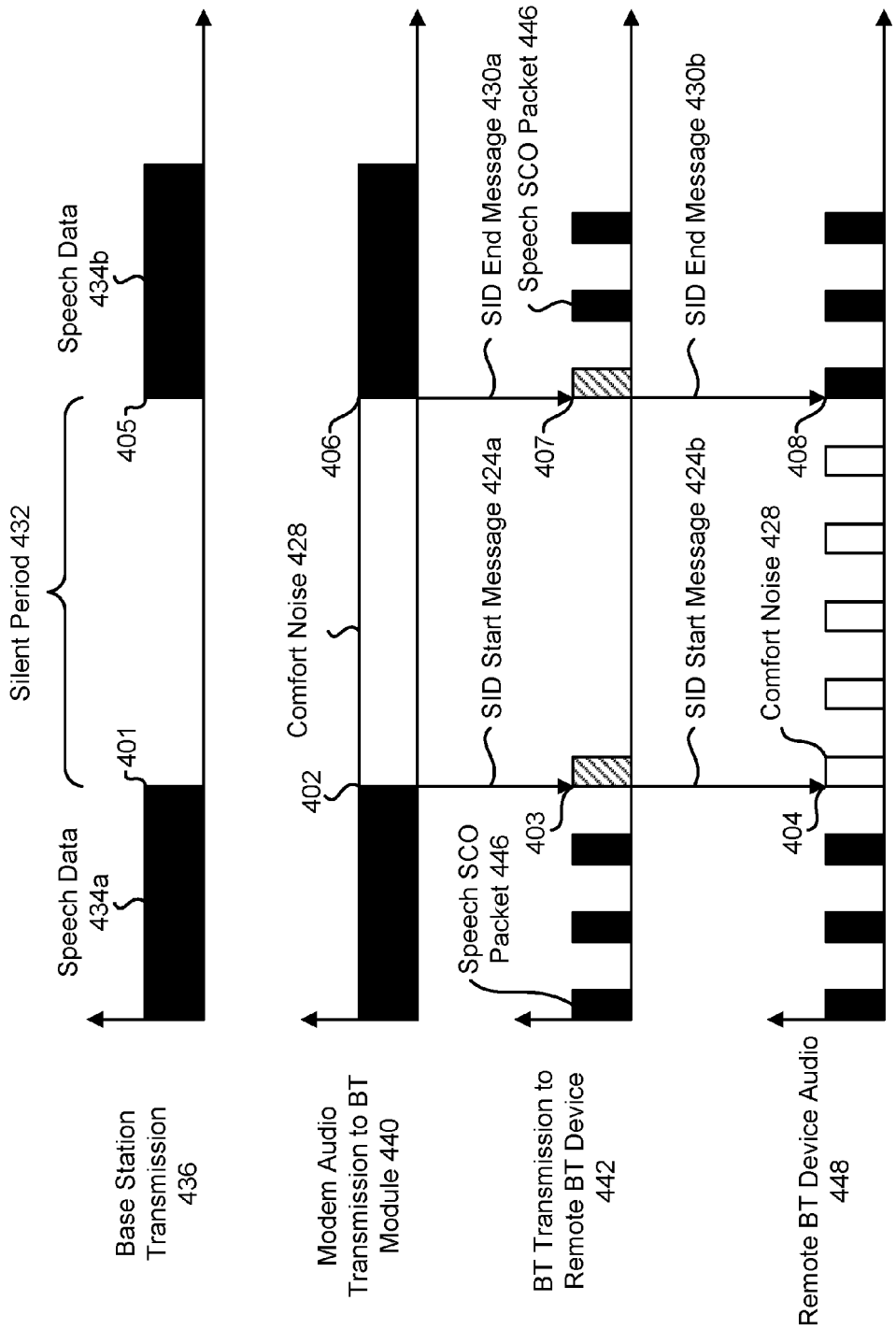
FIG. 4 illustrates an example of sending silent indication (SID) messages from a wireless communication device to a remote BT device to generate comfort noise.

FIG. 4 illustrates an example of sending silent indication (SID) messages from a wireless communication device 102 to a remote BT device 104 to generate comfort noise 428. This example shows the timing for a base station transmission 436, a modem audio transmission 440 to the BT module 116, the BT transmission 442 to the remote BT device 104 and the corresponding remote BT device audio 448.

In this example, the base station 103 is initially transmitting speech data 434a in one or more downlink speech frames of a voice call 106. The modem 108 sends the speech data 434a to the BT module 116 via the modem interface 114. For the BT transmission 442, the BT module 116 sends the speech data 434a to the remote BT device 104 as a series of speech SCO packets 446. The remote BT device 104 then generates the audio 448 for the speech data 434a.

At point 401, the base station 103 stops transmitting a downlink speech frame when there is no speech data, as described above in connection with FIG. 3. This is the start of the silent period 432.

At point 402, the modem 108 detects the start of the silent period 432. The modem 108 replaces the silent period 432 with comfort noise 428 in the modem audio transmission 440 sent to the BT module 116. However, the modem 108 also sends an SID start message 424a to the BT module 116 indicating the start of the silent period 432.

At point 403, upon receiving the SID start message 424a from the modem 108, the BT module 116 sends the SID start message 424b to the remote BT device 104. As described above, the SID start message 424b may be included in an SCO packet or an ACL packet sent to the remote BT device 104. After sending the SID start message 424b, the BT module 116 stops the SCO transmissions to the remote BT device 104. This reduces power consumption and frees RF resources for other coexistence operations.

At point 404, when the remote BT device 104 receives the SID start message 424b from the BT module 116, the remote BT device 104 may insert comfort noise 428 during the receive slots. The remote BT device 104 may continue to insert comfort noise 428 for the duration of the silent period 432.

At point 405, the base station 103 resumes transmission of speech data 434b. This marks the end of the silent period 432. At point 406, the modem 108 detects the speech data 434b transmission and stops inserting comfort noise 428 and instead sends the speech data 434b to the BT module 116. The modem 108 also sends an SID end message 430a to the BT module 116 upon detecting the transmission of speech data 434b from the base station 103.

At point 407, upon receiving the SID end message 430a from the modem 108, the BT module 116 turns on its transmitter 120 and sends the SID end message 430b to the remote BT device 104. As described above, the SID end message 430b may be included in an SCO packet or an ACL packet sent to the remote BT device 104. The BT module 116 may then resume transmission of speech SCO packets 446 to the remote BT device 104.

At point 408, the remote BT device 104 receives the SID end message 430b. Upon receiving the SID end message 430b, the remote BT device 104 stops inserting comfort noise 428 and starts playing the speech data 434b received in the speech SCO packets 446.

Figure 5:
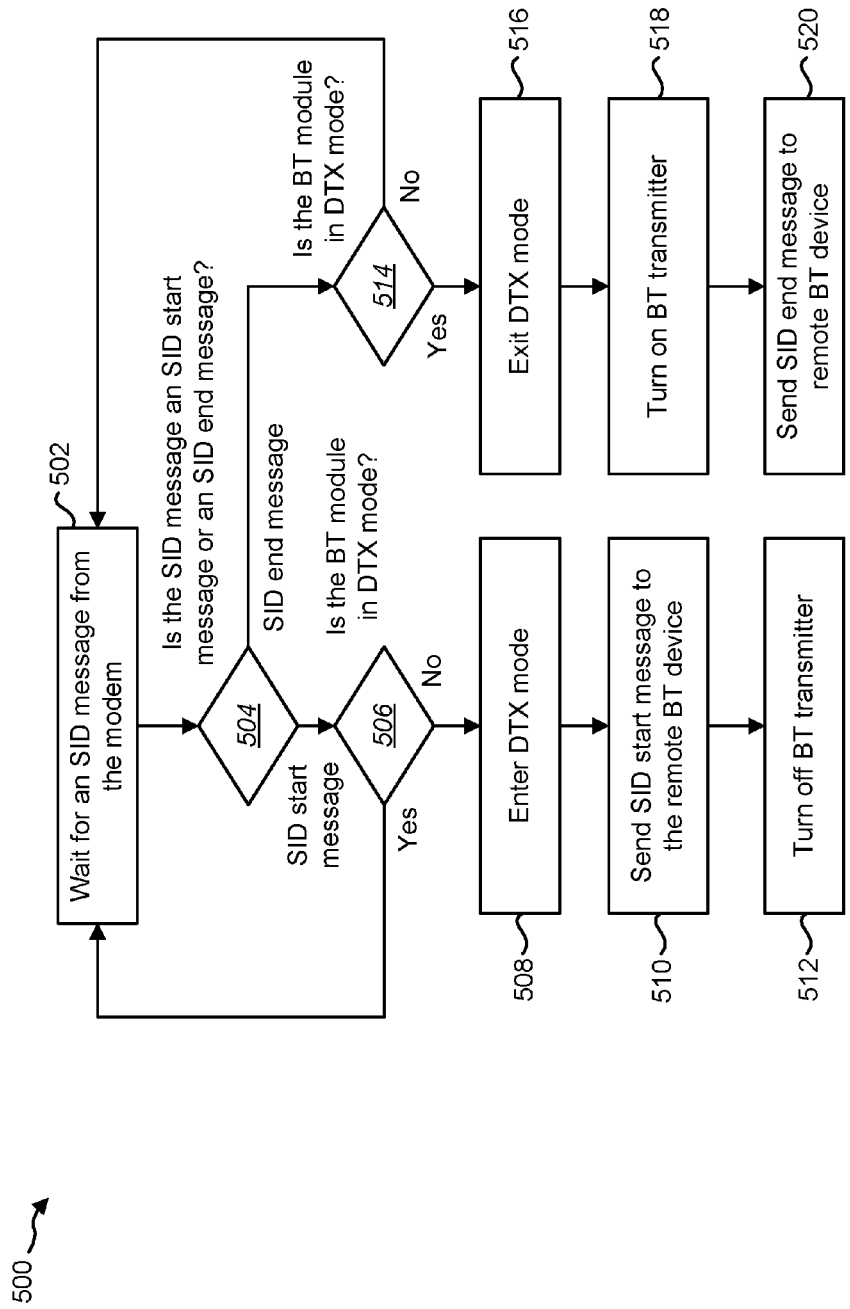
FIG. 5 is a flow diagram illustrating another method for silent period operation by a wireless communication device.

FIG. 5 is a flow diagram illustrating another method 500 for silent period operation by a wireless communication device 102. The method 500 may be performed by a BT module 116 of the wireless communication device 102. The wireless communication device 102 may be conducting a voice call 106. The wireless communication device 102 may receive a circuit-switched voice call 106 from a base station 103. The wireless communication device 102 may have a link (e.g., an SCO link) with a remote BT device 104 to transmit speech data 434.

The BT module 116 may wait 502 for an SID message. For example, when the base station 103 stops transmitting speech data 434 during a silent period 432 of the voice call 106, the BT module 116 may receive an SID start message 124 from the modem 108 of the wireless communication device 102. When the base station 103 resumes transmitting speech data 434 at the end of the silent period 432, the BT module 116 may receive an SID end message 130 from the modem 108 of the wireless communication device 102.

Upon receiving an SID message, the BT module 116 may determine 504 whether the SID message is an SID start message 124 or an SID end message 130. If the SID message is an SID start message 124, then this indicates that the base station 103 has stopped transmitting speech data 434 and the voice call 106 is in a silent period 432. The BT module 116 may determine 506 whether it is in a DTX mode. If the BT module 116 is already in DTX mode, then it is currently not transmitting speech SCO packets 446 to the remote BT device 104. The BT module 116 may continue to wait 502 for another SID message from the modem 108.

If the BT module 116 determines 506 that it is not in DTX mode, then the BT module 116 may enter 508 DTX mode. The BT module 116 may send 510 the SID start message 124 to the remote BT device 104 to indicate that the remote BT device 104 should begin inserting comfort noise 128. The BT module 116 may then turn off 512 its BT transmitter 120.

If the BT module 116 determines 504 that the SID message is an SID end message 130, then this indicates that the base station 103 is transmitting speech data 434 and the voice call 106 is not in a silent period 432. The BT module 116 may determine 514 whether it is in DTX mode. If it is not in DTX mode, then the BT module 116 is currently in an active transmission state with the remote BT device 104 and the BT module 116 may continue to wait 502 for an SID message from the modem 108.

If the BT module 116 determines 514 that it is in DTX mode, then the BT module 116 may exit 516 DTX mode and turn on 518 its BT transmitter 120. The BT module 116 may then send 520 the SID end message 130 to the remote BT device 104 indicating that the remote BT device 104 should stop inserting comfort noise 128 and should resume the transmission of speech SCO packets 446.

Figure 6:
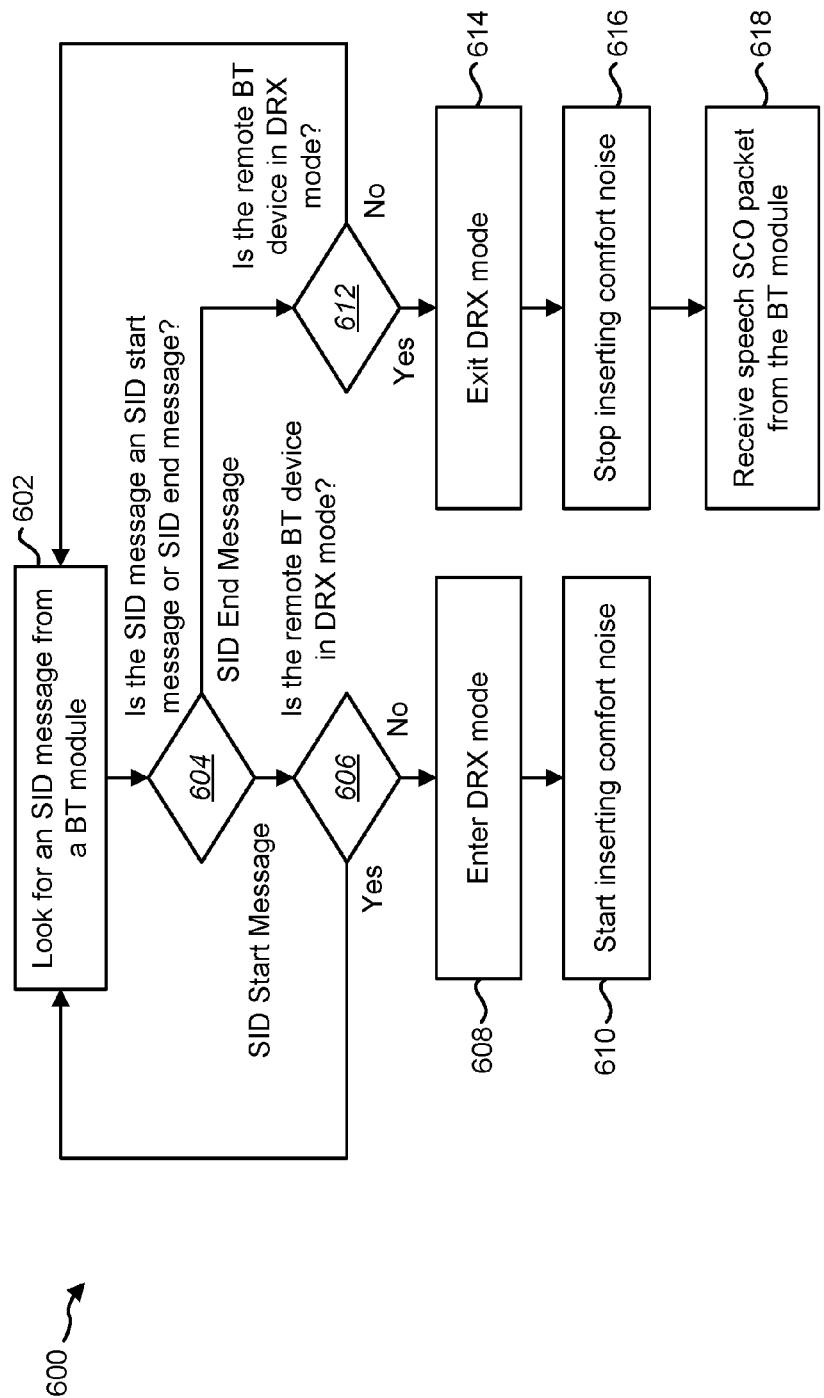
FIG. 6 is a flow diagram illustrating a method for silent period operation by a remote BT device.

FIG. 6 is a flow diagram illustrating a method 600 for silent period operation by a remote BT device 104. The method 600 may be performed by a remote BT device 104. An example of the remote BT device 104 is a BT headset configured to communicate with a BT module 116 over an SCO link.

The remote BT device 104 may have a link (e.g., an SCO link) with a wireless communication device 102 to receive speech data 434 for a voice call 106. The wireless communication device 102 may receive a circuit-switched voice call 106 from a base station 103.

The remote BT device 104 may look 602 for an SID message from the BT module 116 of the wireless communication device 102. For example, when the base station 103 stops transmitting speech data 434 during a silent period 432 of the voice call 106, the modem 108 may send an SID start message 124 to the BT module 116, which then sends the SID start message 124 to the remote BT device 104. When the base station 103 resumes transmitting speech data 434 at the end of the silent period 432, the modem 108 may send an SID end message 130 to the BT module 116, which then sends the SID end message 130 to the remote BT device 104.

Upon receiving an SID message from the BT module 116, the remote BT device 104 may determine 604 whether the SID message is an SID start message 124 or an SID end message 130. If the SID message is an SID start message 124, then this indicates that the base station 103 has stopped transmitting speech data 434 and the voice call 106 is in a silent period 432. The remote BT device 104 may determine 606 whether it is in a DRX mode. If the remote BT device 104 is already in DRX mode, then it is currently not in a state to receive speech SCO packets 446 from the BT module 116. The remote BT device 104 may continue to look 602 for another SID message from the BT module 116.

If the remote BT device 104 determines 606 that it is not in DRX mode, then the remote BT device 104 may enter 608 DRX mode. The remote BT device 104 may then start 610 inserting comfort noise 128.

If the remote BT device 104 determines 604 that the SID message is an SID end message 130, then this indicates that the base station 103 is transmitting speech data 434 and the voice call 106 is not in a silent period 432. The remote BT device 104 may determine 612 whether it is in DRX mode.

If it is not in DRX mode, then the remote BT device 104 is currently in an active reception state with the BT module 116 and the remote BT device 104 may continue to look 602 for an SID message from the BT module 116.

If the remote BT device 104 determines 612 that it is in DRX mode, then the remote BT device 104 may exit 614 DRX mode. The remote BT device 104 may stop 616 inserting comfort noise 128. The remote BT device 104 may then receive 618 one or more speech SCO packets 446 from the BT module 116.

Figure 7:
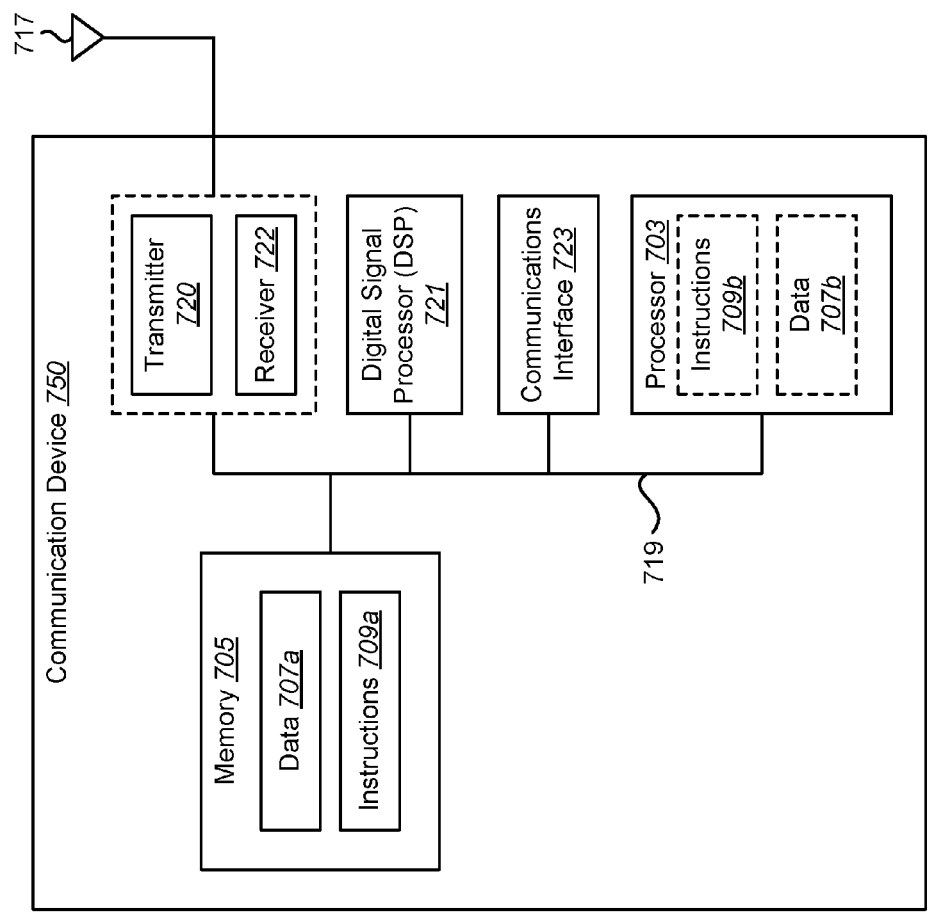
FIG. 7 illustrates certain components that may be included within a communication device.

FIG. 7 illustrates certain components that may be included within a communication device 750. The communication device 750 may be a wireless device, an access terminal, a mobile station, a user equipment (UE), a laptop computer, a desktop computer, a wireless headset, etc. For example, the communication device 750 may be the wireless communication device 102 or the remote BT device 104 of FIG. 1.

The communication device 750 includes a processor 703. The processor 703 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 703 may be referred to as a central processing unit (CPU). Although just a single processor 703 is shown in the communication device 750 of FIG. 7, in an alternative configuration, a combination of processors (e.g., an ARM and DSP) could be used.

The communication device 750 also includes memory 705 in electronic communication with the processor (i.e., the processor can read information from and/or write information to the memory). The memory 705 may be any electronic component capable of storing electronic information. The memory 705 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 707a and instructions 709a may be stored in the memory 705. The instructions may include one or more programs, routines, sub-routines, functions, procedures, code, etc. The instructions may include a single computer-readable statement or many computer-readable statements. The instructions 709a may be executable by the processor 703 to implement the methods disclosed herein. Executing the instructions 709a may involve the use of the data 707a that is stored in the memory 705. When the processor 703 executes the instructions 709, various portions of the instructions 709b may be loaded onto the processor 703, and various pieces of data 707b may be loaded onto the processor 703.

The communication device 750 may also include a transmitter 720 and a receiver 722 to allow transmission and reception of signals to and from the communication device 750 via an antenna 717. The transmitter 720 and receiver 722 may be collectively referred to as a transceiver 718. The communication device 750 may also include (not shown) multiplier transmitters, multiplier antennas, multiplier receivers and/or multiplier transceivers.

The communication device 750 may include a digital signal processor (DSP) 721. The communication device 750 may also include a communications interface 723. The communications interface 723 may allow a user to interact with the communication device 750.

The various components of the communication device 750 may be coupled together by one or more buses, which may include a power bus, a control signal bus, a status signal bus, a data bus, etc. For the sake of clarity, the various buses are illustrated in FIG. 7 as a bus system 719.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as illustrated by FIG. 2, FIG. 5 and FIG. 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication, comprising:
   receiving, by a Bluetooth (BT) module in a wireless communication device, a silent indication (SID) start message and corresponding comfort noise over a modem interface from a separate modem in the wireless communication device, wherein the SID start message and the corresponding comfort noise are generated by the modem and the modem enters a discontinuous reception (DRX) mode in a voice call in response to detecting a silent period in the voice call, wherein the modem exits the DRX mode in the voice call and generates a SID end message in response to detecting that the silent period in the voice call has ended;
   sending the SID start message without the received corresponding comfort noise from the BT module to a remote BT device in a last Synchronous Connection Oriented (SCO) packet as a special non-speech packet indicating the SID start message; and
   disabling a BT transmitter during the silent period based on the SID start message received from the modem.

2. The method of claim 1, wherein the SID start message instructs the remote BT device to insert comfort noise during the silent period.

3. The method of claim 1, wherein the voice call is a circuit-switched voice call.

4. The method of claim 1, further comprising stopping a Synchronous Connection Oriented (SCO) link transmission to the remote BT device upon receiving the SID start message from the modem.

5. The method of claim 1, further comprising:
   receiving a SID end message from the modem at the BT module when the modem detects that the silent period ends;
   enabling the BT transmitter in response to receiving the SID end message; and
   sending the SID end message to the remote BT device, wherein the SID end message instructs the remote BT device to stop inserting comfort noise.

6. The method of claim 5, further comprising resuming an SCO link transmission with the remote BT device upon sending the SID end message to the remote BT device.

7. The method of claim 1, further comprising reallocating radio frequency (RF) resources used to communicate with the remote BT device to another radio interface for a coexistence operation during the silent period.

8. The method of claim 1, wherein the remote BT device is a BT headset configured to communicate with the BT module over an SCO link.

9. A wireless communication device comprising:
   a modem configured to detect a silent period in a voice call and to generate a silent indication (SID) start message and corresponding comfort noise and enter a discontinuous reception (DRX) mode in the voice call in response to detecting the silent period, wherein the modem exits the DRX mode in the voice call and generates a SID end message in response to detecting that the silent period in the voice call has ended; and
   a separate Bluetooth (BT) module configured to:
   receive the SID start message and corresponding comfort noise from the modem over a modem interface;
   send the SID start message without the received corresponding comfort noise to a remote BT device in a last Synchronous Connection Oriented (SCO) packet as a special non-speech packet indicating the SID start message; and
   disable a BT transmitter during the silent period based on the SID start message received from the modem.

10. The wireless communication device of claim 9, wherein the SID start message instructs the remote BT device to insert comfort noise during the silent period.

11. The wireless communication device of claim 9, wherein the voice call is a circuit-switched voice call.

12. The wireless communication device of claim 9, wherein the BT module is further configured to stop a Synchronous Connection Oriented (SCO) link transmission to the remote BT device upon receiving the SID start message from the modem.

13. The wireless communication device of claim 9, wherein the BT module is further configured to:
  receive a SID end message from the modem when the modem detects that the silent period ends;
  enable the BT transmitter in response to receiving the SID end message; and
  send the SID end message to the remote BT device, wherein the SID end message instructs the remote BT device to stop inserting comfort noise.

14. The wireless communication device of claim 13, wherein the BT module is further configured to resume an SCO link transmission with the remote BT device upon sending the SID end message to the remote BT device.

15. An apparatus for wireless communication, comprising:
  means for receiving, at a Bluetooth (BT) module in the apparatus, a silent indication (SID) start message and corresponding comfort noise over a modem interface from a separate modem in the apparatus, wherein the modem comprises means for generating the SID start message and the corresponding comfort noise and means for entering a discontinuous reception (DRX) mode in a voice call in response to detecting a silent period in the voice call, wherein the modem comprises means for exiting the DRX mode in the voice call and means for generating a SID end message in response to detecting that the silent period in the voice call has ended;
  means for sending the SID start message without the received corresponding comfort noise from the BT module to a remote BT device in a last Synchronous Connection Oriented (SCO) packet as a special non-speech packet indicating the SID start message; and
  means for disabling a BT transmitter during the silent period based on the SID start message received from the modem.

16. The apparatus of claim 15, wherein the SID start message instructs the remote BT device to insert comfort noise during the silent period.

17. The apparatus of claim 15, further comprising means for stopping a Synchronous Connection Oriented (SCO) link transmission to the remote BT device upon receiving the SID start message from the modem.

18. The apparatus of claim 15, further comprising:
  means for receiving a SID end message from the modem at the BT module when the modem detects that the silent period ends;
  means for enabling the BT transmitter in response to receiving the SID end message; and
  means for sending the SID end message to the remote BT device, wherein the SID end message instructs the remote BT device to stop inserting comfort noise.

19. A computer-program product for wireless communication, the computer-program product comprising a non-transitory computer-readable medium having instructions thereon, the instructions comprising:
  code for causing a Bluetooth (BT) module in a wireless communication device to receive a silent indication (SID) start message and corresponding comfort noise over a modem interface from a separate modem in the wireless communication device, wherein the SID start message and the corresponding comfort noise are generated by the modem and the modem enters a discontinuous reception (DRX) mode in a voice call in response to detecting a silent period in the voice call, wherein the modem exits the DRX mode in the voice call and generates a SID end message in response to detecting that the silent period in the voice call has ended;
  code for causing the BT module to send the SID start message without the received corresponding comfort noise to a remote BT device in a last Synchronous Connection Oriented (SCO) packet as a special non-speech packet indicating the SID start message; and
  code for causing the BT module to disable a BT transmitter during the silent period based on the SID start message received from the modem.

20. The computer-program product of claim 19, wherein the SID start message instructs the remote BT device to insert comfort noise during the silent period.

21. The computer-program product of claim 19, further comprising code for causing the BT module to stop a Synchronous Connection Oriented (SCO) link transmission to the remote BT device upon receiving the SID start message from the modem.

22. The computer-program product of claim 19, further comprising:
  code for causing the BT module to receive a SID end message from the modem at the BT module when the modem detects that the silent period ends;
  code for causing the BT module to enable the BT transmitter in response to receiving the SID end message; and
  code for causing the BT module to send the SID end message to the remote BT device, wherein the SID end message instructs the remote BT device to stop inserting comfort noise.

* * * * *